G. LAMBERT.
CORN-PLANTER.
No. 178,166.
Patented May 30, 1876.
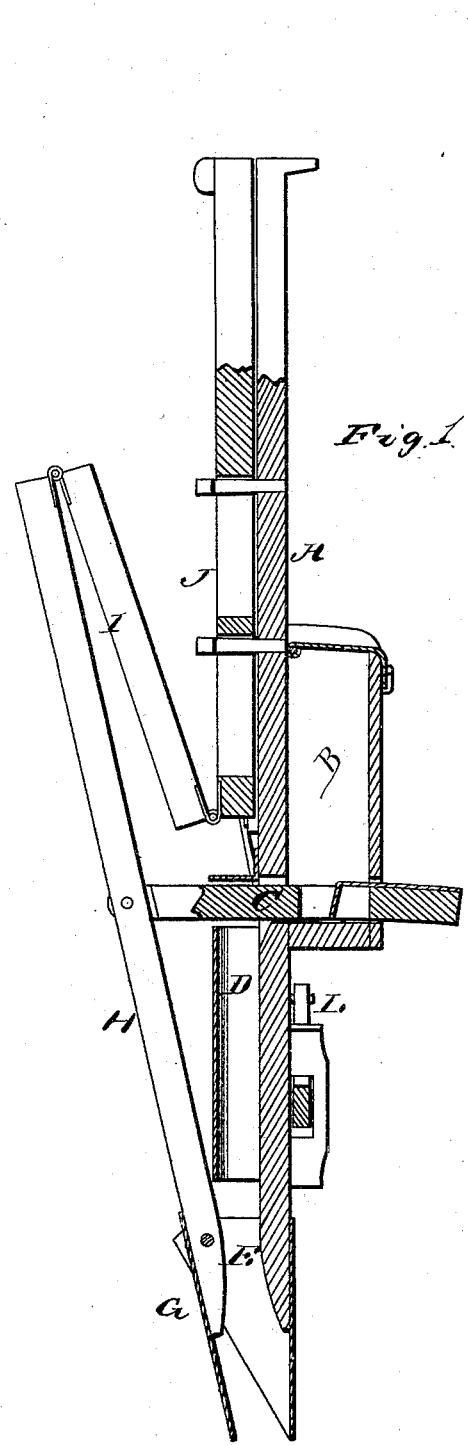
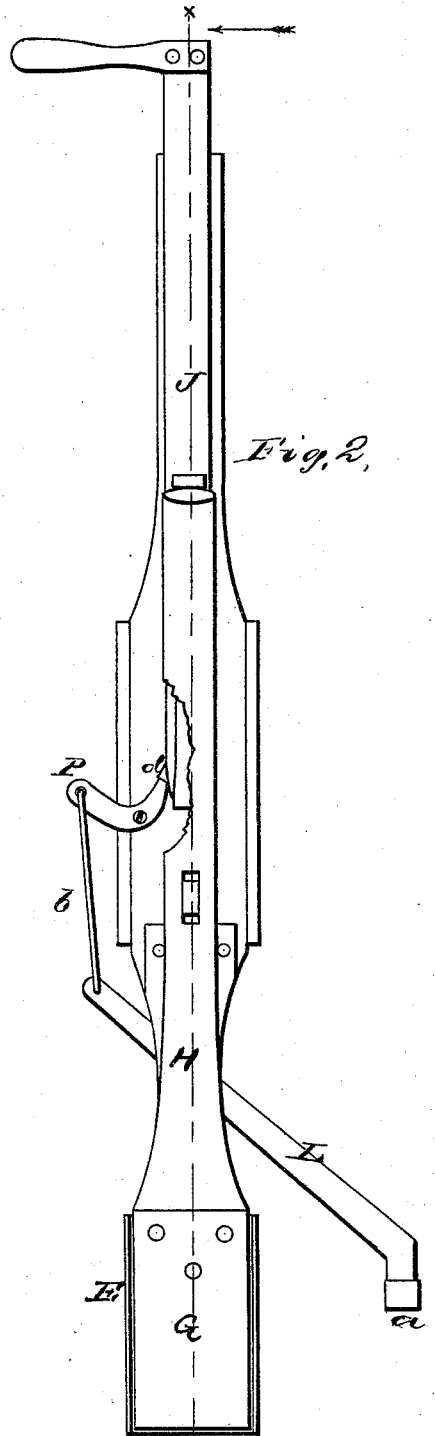
WITNESSES
Robert Everitt
George E. Upham.
INVENTOR.
George Lambert.
Gilmore, Smith & Co.
ATTORNEYS.

UNITED STATES PATENT OFFICE.

GEORGE LAMBERT, OF HILL GROVE, OHIO.

IMPROVEMENT IN CORN-PLANTERS.

Specification forming part of Letters Patent No. 178,166, dated May 30, 1876; application filed April 8, 1876.

*To all whom it may concern:*

Be it known that I, GEORGE LAMBERT, of Hill Grove, in the county of Darke and State of Ohio, have invented a new and valuable Improvement in Corn-Planters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical section through line x x, Fig. 2, and Fig. 2 is a plan view of the same.

The nature of my invention consists in the construction and arrangement of a hand corn-planter, as will be hereinafter more fully set forth.

In the annexed drawings, A represents the staff of the corn-planter, to which the corn-box or reservoir is secured. In the bottom of this box is the horizontal slide C for taking out the requisite amount of corn and allowing the same to be drawn down through a conductor or tube, D, on the back of the staff A to the foot E at the bottom, where it is retained by the back plate G, which is attached to the lower end of the lever H, and said lever pivoted in the foot. The outer end of the dropping-slide C is pivoted in a mortise in the lever H. The upper end of this lever is, by a hinged bar, I, connected to the lower end of the sliding handle J.

The machine is operated in the same manner as other corn-planters of this class—that is to say, by moving the handle J up and down, which moves the slide C out and in and opens and closes the foot. On the front of the machine, near the lower end, is pivoted an arm, L, having a foot, a, at its lower end. The upper end of this arm is, by a rod, b, connected with a trigger, P, so arranged that when the handle J is moved up it will fall and catch under a projection, d, thereon, and thus hold the handle so that it cannot fall down of its own weight. As the planter is inserted in the ground, the foot a will strike the same and release the trigger from the handle and allow the same to be pushed down for planting. When the planter is raised up for the next hill, the trigger will fall back to its place again.

It will be noticed that this planter can be operated entirely with one hand, and that the machine is simple, cheap, and durable, and not liable to get out of order.

What I claim as new, and desire to secure by Letters Patent, is—

The pivoted arm L, with foot a, connecting-rod b, and trigger P, in combination with the handle or operating part of a corn-planter, as and for the purpose set forth.

In testimony that I claim the above I have hereunto subscribed my name in the presence of two witnesses.

GEORGE LAMBERT.

Witnesses:
SAMUEL KENARD,
J. B. CRENSTON.